United States Patent
Fukami

(10) Patent No.: US 11,062,603 B2
(45) Date of Patent: Jul. 13, 2021

(54) OBJECT DETECTION DEVICE FOR VEHICLE AND OBJECT DETECTION SYSTEM FOR VEHICLE

(71) Applicants: AutoNetworks Technologies, Ltd., Mie (JP); Sumitomo Wiring Systems, Ltd., Mie (JP); Sumitomo Electric Industries, Ltd., Osaka (JP)

(72) Inventor: Yuuya Fukami, Mie (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

(*) Notice: Subject to any disclaimer, the term of this patent is extended or adjusted under 35 U.S.C. 154(b) by 141 days.

(21) Appl. No.: 16/349,365

(22) PCT Filed: Oct. 31, 2017

(86) PCT No.: PCT/JP2017/039220
§ 371 (c)(1),
(2) Date: May 13, 2019

(87) PCT Pub. No.: WO2018/092577
PCT Pub. Date: May 24, 2018

(65) Prior Publication Data
US 2019/0371178 A1    Dec. 5, 2019

(30) Foreign Application Priority Data
Nov. 18, 2016  (JP) .............................. JP2016-224810

(51) Int. Cl.
*G08G 1/16*     (2006.01)
*G01S 19/51*    (2010.01)

(52) U.S. Cl.
CPC .............. *G08G 1/161* (2013.01); *G01S 19/51* (2013.01); *G08G 1/166* (2013.01)

(58) Field of Classification Search
CPC ......... G08G 1/161; G08G 1/166; G01S 19/51
See application file for complete search history.

(56) References Cited

U.S. PATENT DOCUMENTS

| 8,368,755 B2 * | 2/2013 | Nishida ............. G06K 9/00805 348/148 |
| 9,934,689 B2 * | 4/2018 | Prokhorov ...... B60W 30/18154 |
| 2007/0139523 A1 | 6/2007 | Nishida et al. |

FOREIGN PATENT DOCUMENTS

| JP | 2006-318093 A | 11/2006 |
| JP | 2007-072860 A | 3/2007 |
| JP | 2008-059178 A | 3/2008 |

OTHER PUBLICATIONS

International Search Report, Application No. PCT/JP2017/039220, dated Nov. 28, 2017. ISA/Japan Patent Office.

* cited by examiner

*Primary Examiner* — Tyler J Lee
*Assistant Examiner* — Yufeng Zhang
(74) *Attorney, Agent, or Firm* — Honigman LLP

(57) ABSTRACT

Provided is an object detection device for a vehicle or an object detection system for a vehicle. The object detection device for a vehicle includes a vehicle position recognition unit that is provided in the first vehicle and recognizes the position of a second vehicle, an information acquisition unit that is provided in the first vehicle and acquires object position information regarding an external object that is generated based on a result of detection of the external object by an object position detection unit of the second vehicle, and a position identification unit that identifies a position of the external object based on the position of the (Continued)

second vehicle recognized by the vehicle position recognition unit and the object position information acquired by the information acquisition unit.

8 Claims, 5 Drawing Sheets

Legend
A= Inter-vehicle communication unit (information transmission unit)
B= Inter-vehicle communication unit (information acquisition unit)
C= Wireless communication unit (second information acquisition unit)

OBJECT DETECTION DEVICE FOR VEHICLE AND OBJECT DETECTION SYSTEM FOR VEHICLE

CROSS-REFERENCE TO RELATED APPLICATIONS

This application is the U.S. national stage of PCT/JP2017/039220 filed on Oct. 31, 2017, which claims priority of Japanese Patent Application No. JP 2016-224810 filed on Nov. 18, 2016, the contents of which are incorporated herein.

TECHNICAL FIELD

The present disclosure relates to an object detection device for a vehicle and an object detection system for a vehicle.

BACKGROUND

JP 2007-72860A discloses a proximity detection system that detects proximity of an automobile to a pedestrian. In the proximity detection system disclosed in JP 2007-72860A, a search signal transmission means that is provided in a vehicle-mounted device transmits a search signal for searching for a portable terminal device. Upon receiving the search signal, the portable terminal device of a pedestrian sends back a response signal that includes the current position of the portable terminal device. The vehicle-mounted device estimates whether or not the vehicle will come into close proximity to the portable terminal device based on the received response signal.

However, the proximity detection system disclosed in JP 2007-72860A uses a method of identifying a positional relationship between a driver's vehicle and a pedestrian based on GPS information only, and includes problems caused by dependence on GPS information only. For example, this method cannot be realized unless the pedestrian is in possession of a terminal that is capable of using GPS, and detection accuracy of the position of the pedestrian is largely affected by the accuracy of GPS technology. On the other hand, as another method for detecting an external object, it is possible to consider a method of detecting an external object by mounting a radar or the like to a vehicle, but this method has a problem in that an external object that is not within an area that can be recognized by the radar mounted to the vehicle (such as an external object that is located in a blind spot with respect to the vehicle acting as the base point) cannot be detected at all.

The present disclosure was made under the above-described circumstances, and it is an object of the present disclosure to provide an object detection device for a vehicle or an object detection system for a vehicle that is capable of detecting an external object that is difficult to detect directly from the position of a first vehicle with higher accuracy.

SUMMARY

An object detection device for a vehicle according to a first disclosure includes a vehicle position recognition unit that is provided in a first vehicle and recognizes a position of a second vehicle and an information acquisition unit that is provided in the first vehicle and acquires, from the second vehicle, object position information regarding an external object that is generated based on a result of detection of the external object by an object position detection unit of the second vehicle. A position identification unit identifies a position of the external object based on the position of the second vehicle recognized by the vehicle position recognition unit and the object position information acquired by the information acquisition unit. The information acquisition unit acquires the object position information that includes information that enables identification of a distance from the second vehicle to the external object, a second reference direction determined by the second vehicle, and a direction of the external object from the second vehicle with respect to the second reference direction. The position identification unit further identifies a direction of the external object from the first vehicle with respect to a first reference direction determined by the first vehicle, based on the first reference direction, a distance from the first vehicle to the second vehicle, a direction of the second vehicle from the first vehicle with respect to the first reference direction, the distance from the second vehicle to the external object, the second reference direction, and the direction of the external object from the second vehicle with respect to the second reference direction.

An object detection system for a vehicle according to a second aspect of the disclosure includes an information processing device for a first vehicle that is provided in a first vehicle and an information processing device for a second vehicle that is provided in a second vehicle. The information processing device for the second vehicle includes an object position detection unit that detects a position of an external object and an information transmission unit that transmits, to the first vehicle, object position information regarding the external object that is generated based on a result of detection of the external object by the object position detection unit. The information processing device for the first vehicle includes a vehicle position recognition unit that recognizes a position of the second vehicle, an information acquisition unit that acquires the object position information transmitted from the information transmission unit and a position identification unit that identifies a position of the external object based on the position of the second vehicle recognized by the vehicle position recognition unit and the object position information acquired by the information acquisition unit. The information acquisition unit acquires the object position information that includes information that enables identification of a distance from the second vehicle to the external object, a second reference direction determined by the second vehicle, and a direction of the external object from the second vehicle with respect to the second reference direction. The position identification unit identifies a direction of the external object from the first vehicle with respect to a first reference direction determined by the first vehicle, based on the first reference direction, a distance from the first vehicle to the second vehicle, a direction of the second vehicle from the first vehicle with respect to the first reference direction, the distance from the second vehicle to the external object, the second reference direction, and the direction of the external object from the second vehicle with respect to the second reference direction.

Advantageous Effects of Disclosure

In the object detection device for a vehicle and the object detection system for a vehicle according to the first and second disclosures, the position identification unit provided in the first vehicle identifies the position of the external object based on the position of the second vehicle recognized by the vehicle position recognition unit and the object position information acquired by the information acquisition unit. As described above, the position of the external object can be identified using the result of detection of the external object by the object position detection unit of the second vehicle, and therefore, even when it is difficult to detect an external object directly from the position of the first vehicle, the possibility that the external object can be detected with high accuracy is increased so long as the external object can be detected by the object position detection unit of the second vehicle.

DETAILED DESCRIPTION OF PREFERRED EMBODIMENTS

Figure 1:
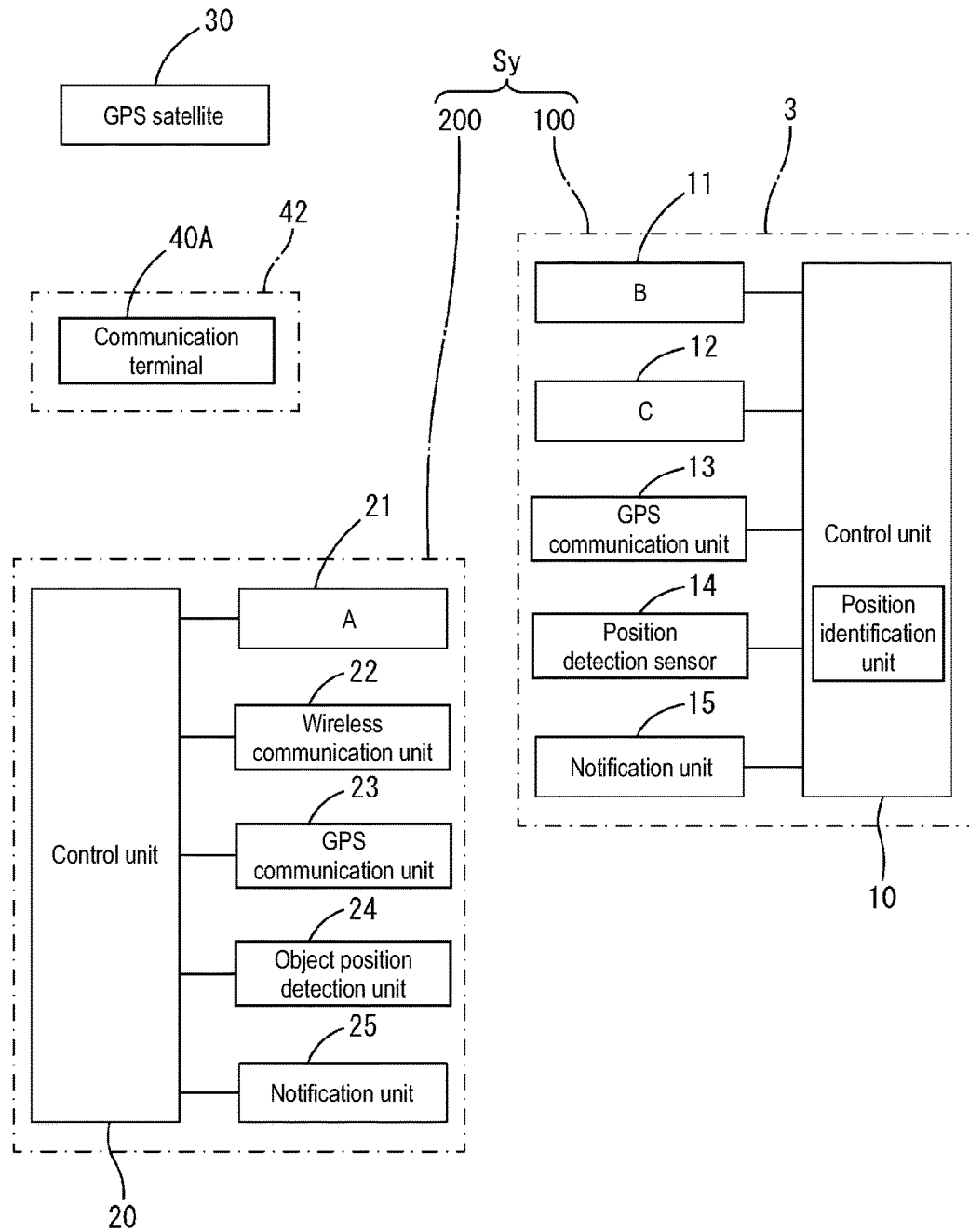
FIG. 1 is a block diagram schematically illustrating an object detection system for a vehicle according to a first embodiment and a relevant configuration thereof.

The following describes preferred examples of the present disclosure.

In the first and second aspects of the disclosure, the first vehicle may include a second information acquisition unit that acquires position information regarding an information terminal that the external object has from a position identification system that identifies a position of the information terminal based on GPS information. Under a condition that the position of the second vehicle is recognized by the vehicle position recognition unit and the object position information is acquired by the information acquisition unit from the second vehicle, the position identification unit may identify the position of the external object based on a result of recognition of the vehicle position recognition unit and the object position information, and in at least either of a case where the position of the second vehicle is not recognized by the vehicle position recognition unit and a case where the object position information is not acquired by the information acquisition unit from the second vehicle, the position identification unit may identify the position of the external object under a condition that position information regarding the information terminal is acquired by the second information acquisition unit.

According to this configuration, even when the vehicle position recognition unit cannot recognize the position of the second vehicle or when the information acquisition unit cannot acquire the object position information from the second vehicle, there is a possibility that the position of the external object can be identified. For example, in a case where the external object is in possession of the information terminal, it is likely that the position of the external object will be identified based on the position information regarding the information terminal acquired by the second information acquisition unit.

In the first and second disclosures, the vehicle position recognition unit may include a position detection sensor that detects the position of the second vehicle. The position identification unit may identify the position of the external object based on the position of the second vehicle detected by the position detection sensor and the object position information acquired by the information acquisition unit.

According to this configuration, the positional relationship between the first vehicle and the second vehicle can be obtained with high accuracy based on the result of detection by the position detection sensor, and the positional relationship between the second vehicle and the external object can also be obtained with high accuracy based on the result of detection by the object position detection unit, and therefore the relative position of the external object with respect to the first vehicle can be identified more accurately.

First Embodiment

The following describes a first embodiment in which the present disclosure is embodied.

An object detection system Sy for a vehicle (hereinafter also referred to as an object detection system Sy) illustrated in FIG. 1 includes a plurality of vehicle-mounted devices that are respectively mounted in a plurality of vehicles. The following describes, as a representative example, an object detection system Sy that includes an information processing device 100 for a first vehicle (hereinafter also referred to as an information processing device 100) that is provided in a first vehicle 1 and an information processing device 200 for a second vehicle (hereinafter also referred to as an information processing device 200) that is provided in a second vehicle 2.

The object detection system Sy is configured as a system that detects an external object 40 that is present outside the first vehicle 1. In the example of FIG. 1, the external object 40 is a passerby and the object detection system Sy is a system that detects passersby. Note that a passerby is not limited to a pedestrian and may be a person riding a vehicle such as a bicycle or a motorcycle, for example.

A part or the entirety of the information processing device 100 provided in the first vehicle 1 constitutes an object detection device 3 for a vehicle. The following describes a case where the object detection device 3 for a vehicle is constituted by the information processing device 100 and detects the position of an external object based on information from one or a plurality of second vehicles 2.

As illustrated in FIG. 1, the information processing device 100 includes a position detection sensor 14 (vehicle position recognition unit) that recognizes the position of the second vehicle 2, an inter-vehicle communication unit 11 that serves as an information acquisition unit that acquires object position information transmitted from an inter-vehicle communication unit 21 (information transmission unit) described later, and a wireless communication unit 12 that serves as a second information acquisition unit that acquires position information regarding an information terminal 40A that the external object 40 has, from a position identification system that identifies the position of the information terminal 40A based on GPS information. Further, the information processing device 100 includes a control unit 10 that serves as a position identification unit that identifies the position of the external object 40 based on the position of the second vehicle 2 recognized by the position detection sensor 14

(vehicle position recognition unit) and the object position information acquired by the inter-vehicle communication unit 11 (information acquisition unit).

The inter-vehicle communication unit 11 is configured as a device that performs known inter-vehicle communication with a second vehicle 2 that is located a short distance from the first vehicle 1 (i.e., a distance over which communication with the inter-vehicle communication unit 11 is possible). The inter-vehicle communication unit 11 is capable of transmitting information to the inter-vehicle communication unit 21 that is mounted in the second vehicle 2 and receiving information from the inter-vehicle communication unit 21 by performing inter-vehicle communication with the inter-vehicle communication unit 21. Since communication is enabled in this configuration as described above, information held by the second vehicle 2 can be transmitted to the first vehicle 1 and, conversely, information held by the first vehicle 1 can also be transmitted to the second vehicle 2.

The method of inter-vehicle communication between the inter-vehicle communication unit 11 and the inter-vehicle communication unit 21 may be any known method that enables wireless communication. Also, inter-vehicle communication between the inter-vehicle communication unit 11 and the inter-vehicle communication unit 21 may be performed, for example, by any of a method by which wireless communication is directly performed not via an external device, a method by which information is transmitted from the inter-vehicle communication unit 11 to the inter-vehicle communication unit 21 via an external device, and a method by which information is transmitted from the inter-vehicle communication unit 21 to the inter-vehicle communication unit 11 via an external device.

The wireless communication unit 12 is a device that wirelessly communicates with an external information device and is configured to communicate with the information terminal 40A, which is a mobile phone or the like, in the possession of the external object 40, which is a passerby, or an external system that is capable of communicating with the information terminal 40A. In the representative example illustrated in FIG. 1, the information terminal 40A is configured as the position identification system that is capable of identifying the position of the information terminal 40A based on GPS information, and the wireless communication unit 12 can wirelessly communicate with the information terminal 40A by a known wireless communication method. Note that wireless communication between the information terminal 40A and the wireless communication unit 12 may be performed, for example, by any of a method by which wireless communication is directly performed not via an external device, a method by which information is transmitted from the information terminal 40A to the wireless communication unit 12 via an external device, and a method by which information is transmitted from the wireless communication unit 12 to the information terminal 40A via an external device.

A GPS communication unit 13 is configured as a known GPS communication device that is capable of communicating with a GPS satellite 30. The GPS communication unit 13 acquires position information (GPS position information) that identifies the position of the first vehicle 1 by communicating with the GPS satellite 30, for example. The control unit 10 is capable of calculating the position (specifically, latitude and longitude) of the first vehicle 1 based on the position information (GPS position information) acquired by the GPS communication unit 13.

The position detection sensor 14 is configured as a sensor that detects an external object that is within a predetermined range with respect to the first vehicle 1. The position detection sensor 14 is constituted by a laser radar, a millimeter wave radar, or a stereo camera, for example, and is capable of detecting the position of a structure, a passerby, another vehicle, or the like that is located in front of the first vehicle 1 through sensing, with high accuracy.

The control unit 10 is configured as an information processing device (for example, microcomputer or the like) that includes a CPU and a memory, for example. The control unit 10 corresponds to an example of the position identification unit and functions to identify the positions of the second vehicle 2 and the external object 40 by calculating relative positions thereof with respect to the first vehicle 1 based on information acquired by the inter-vehicle communication unit 11, the wireless communication unit 12, the GPS communication unit 13, and the position detection sensor 14.

A notification unit 15 is constituted by a sound emitting device such as a buzzer, or a display device such as a lamp or a display portion, and gives notification using sound, light, images, or the like.

The information processing device 200 provided in the second vehicle 2 includes an object position detection unit 24 that detects the position of the external object 40, the inter-vehicle communication unit 21 that serves as an information transmission unit that transmits, to the first vehicle 1, object position information regarding the external object 40 that is generated based on a result of detection of the external object 40 by the object position detection unit 24, and a control unit 20.

The inter-vehicle communication unit 21 has a configuration similar to that of the inter-vehicle communication unit 11 and functions similarly to the inter-vehicle communication unit 11. The inter-vehicle communication unit 21 corresponds to an example of the information transmission unit and functions to transmit the object position information regarding the external object generated based on the result of detection of the external object by the object position detection unit 24 to the first vehicle 1 through wireless communication.

The object position detection unit 24 has a hardware configuration similar to that of the above-described position detection sensor 14, for example, and is configured as a sensor that detects an external object that is within a predetermined range with respect to the second vehicle 2. The object position detection unit 24 is constituted by a laser radar, a millimeter wave radar, or a stereo camera, for example, and is capable of detecting the position of a structure, a passerby, another vehicle, or the like that is located in front of the second vehicle 2 through sensing, with high accuracy.

A wireless communication unit 22 has a hardware configuration similar to that of the wireless communication unit 12 and functions similarly to the wireless communication unit 12. A GPS communication unit 23 has a hardware configuration similar to that of the GPS communication unit 13 and functions similarly to the GPS communication unit 13. A notification unit 25 has a hardware configuration similar to that of the notification unit 15 and functions similarly to the notification unit 15.

The GPS satellite 30 is a known GPS satellite that is used in the GPS system, and, in actuality, there are a plurality of GPS satellites. In this configuration, each of the information terminal 40A and the information processing devices 100 and 200 is capable of identifying a position (latitude and longitude) using the GPS system, and further, each of the information terminal 40A and the information processing devices 100 and 200 is capable of identifying the orientation of a reference direction (front-rear direction) of the terminal or device by a known method.

The information terminal 40A is configured as a mobile phone, a smartphone, a portable computer, or any other portable information terminal. A position identification system 42 is a system that identifies the position of the information terminal 40A based on GPS information that is acquired by the information terminal 40A through communication with the GPS satellite 30. The position identification system 42 is only required to be capable of identifying the position of the information terminal 40A based on the GPS information, and may be constituted by the information terminal 40A or an information processing device that is capable of wirelessly communicating with the information terminal 40A (such as an external computer that is connected to the information terminal 40A via a network). The position identification system 42 is capable of communicating with the wireless communication units 12 and 22 of the information processing devices 100 and 200 and wirelessly transmitting position information (information that indicates latitude, longitude, and the like) regarding the information terminal 40A to the information processing devices 100 and 200.

Next, object detection control that is executed by the information processing device 100 will be described mainly with reference to FIG. 4.

Figure 4:
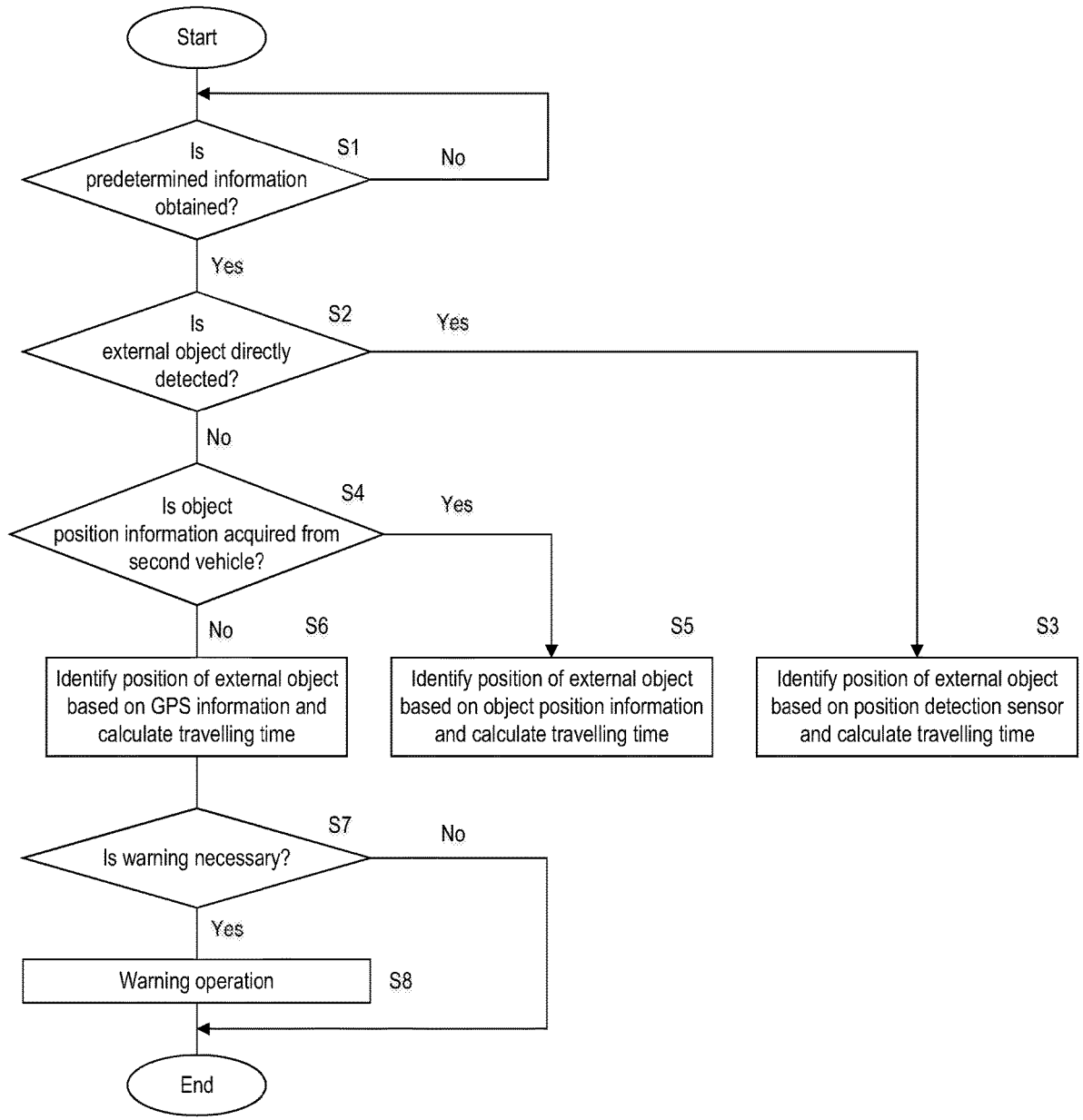
FIG. 4 is a flowchart illustrating the flow of external object detection control that is executed by an information processing device for a first vehicle.

The control unit 10 of the information processing device 100 repeatedly executes control illustrated in FIG. 4, for example, when the first vehicle 1 is in an operation state (for example, when the ignition switch of the first vehicle 1 is turned on). After starting the control illustrated in FIG. 4, the control unit 10 initially determines whether or not predetermined information has been obtained (step S1). Specifically, in step S1, the control unit 10 determines whether or not any following condition is satisfied, "direct detection of the external object 40", "acquisition of object position information from the second vehicle 2", and "receiving of position information regarding the external object 40", and if any of the conditions is satisfied, makes a determination in step S2. Note that for as long as none of the conditions are satisfied in step S1, the determination in step S1 is repeatedly performed, and a standby state is maintained until any of the conditions is satisfied.

Figure 2:
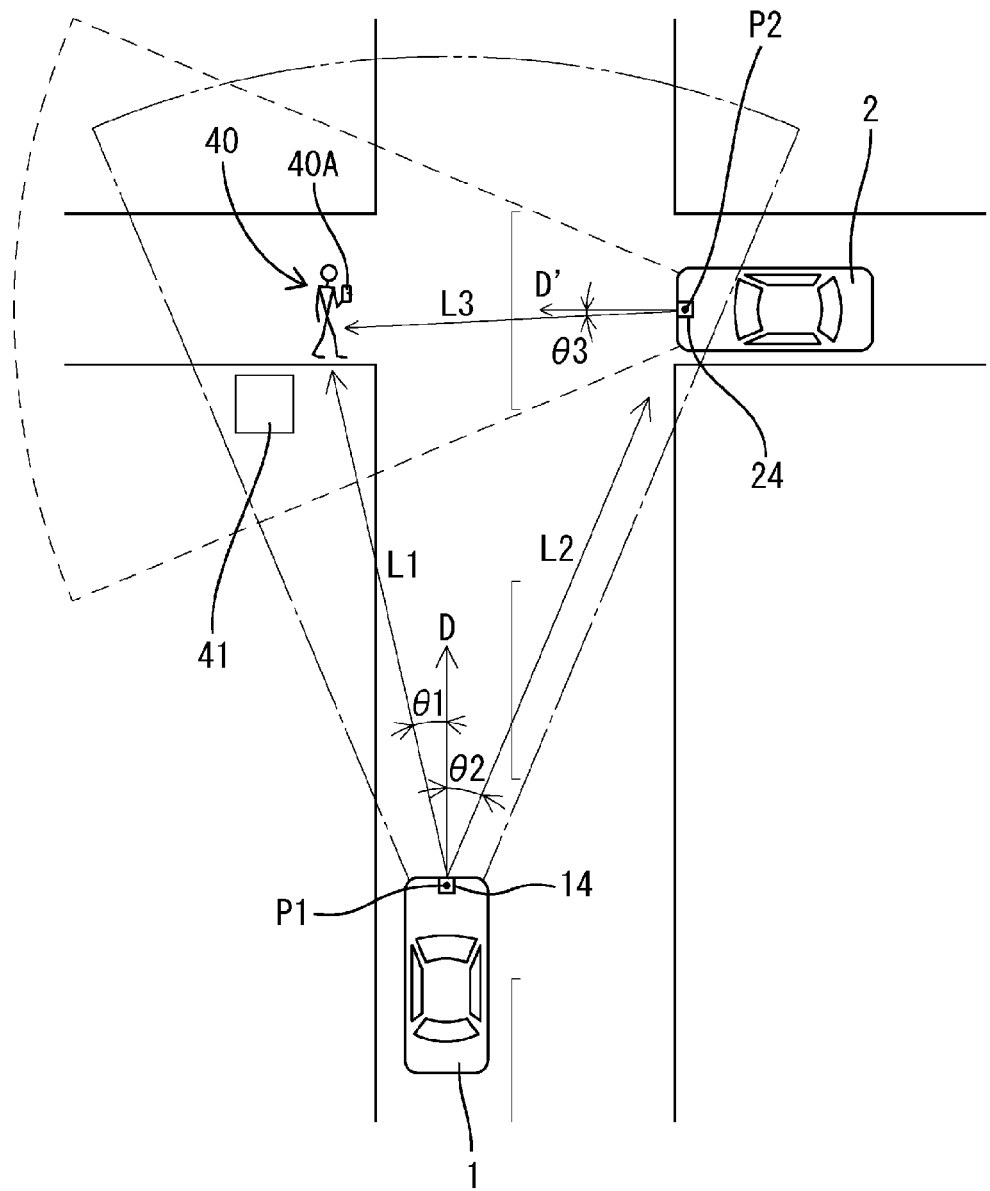
FIG. 2 is an illustrative diagram illustrating an example of a state in which an external object is detected by the object detection system for a vehicle according to the first embodiment.

In step S2, the control unit 10 determines whether or not the external object 40 has been directly detected. Specifically, it is determined whether or not the following condition is satisfied, "the external object is detected by the position detection sensor 14, and the position of the external object is within a predetermined distance from the first vehicle 1 and within a predetermined height range in a sensing region M1", and if the condition is satisfied, the distance to the external object and the direction of the external object are calculated in step S3. For example, when the external object 40 is present as illustrated in FIG. 2 and is detected by the position detection sensor 14, and the position of the external object 40 is within the predetermined distance from the first vehicle 1 and within the predetermined height range in the sensing region M1, a distance L1 from the first vehicle 1 to the external object 40 and a direction θ1 of the external object 40 with respect to a predetermined reference direction D are calculated based on the position of the external object 40 detected by the position detection sensor 14. Note that, in this configuration, the front-rear direction of the vehicle is the reference direction D, which is the travel direction in the example of FIG. 2. Also, the information processing device 100 is capable of identifying the orientation of the reference direction D based on GPS information acquired by the GPS communication unit 13.

Note that a vehicle speed V1 of the travelling first vehicle 1 may be acquired from a speed sensor or the like (not illustrated) of the first vehicle 1, and the control unit 10 may calculate a distance from the current position of the first vehicle 1 to a position where it is at its closest to the external object 40 (for example, a position where the first vehicle 1 is at its closest to the external object 40 assuming that the external object 40 stands still and the first vehicle 1 travels in the travel direction) based on the distance L1 and the direction θ1 of the external object 40 relative to the first vehicle 1, and calculate a time T1 necessary for the first vehicle 1 to travel from the current position to the position where it is at its closest to the external object 40 by dividing the obtained distance by the vehicle speed V1.

On the other hand, if it is determined, in step S2, that the external object 40 was not directly detected, the control unit 10 proceeds to step S4 and determines whether or not object position information has been acquired from the second vehicle 2. Specifically, if it is determined that the inter-vehicle communication unit 11 of the first vehicle 1 wirelessly communicated with the inter-vehicle communication unit 21 of the second vehicle 2 and acquired predetermined object position information from the inter-vehicle communication unit 21, processing in step S5 it to be performed, and otherwise, processing in step S6 is to be performed.

Figure 3:
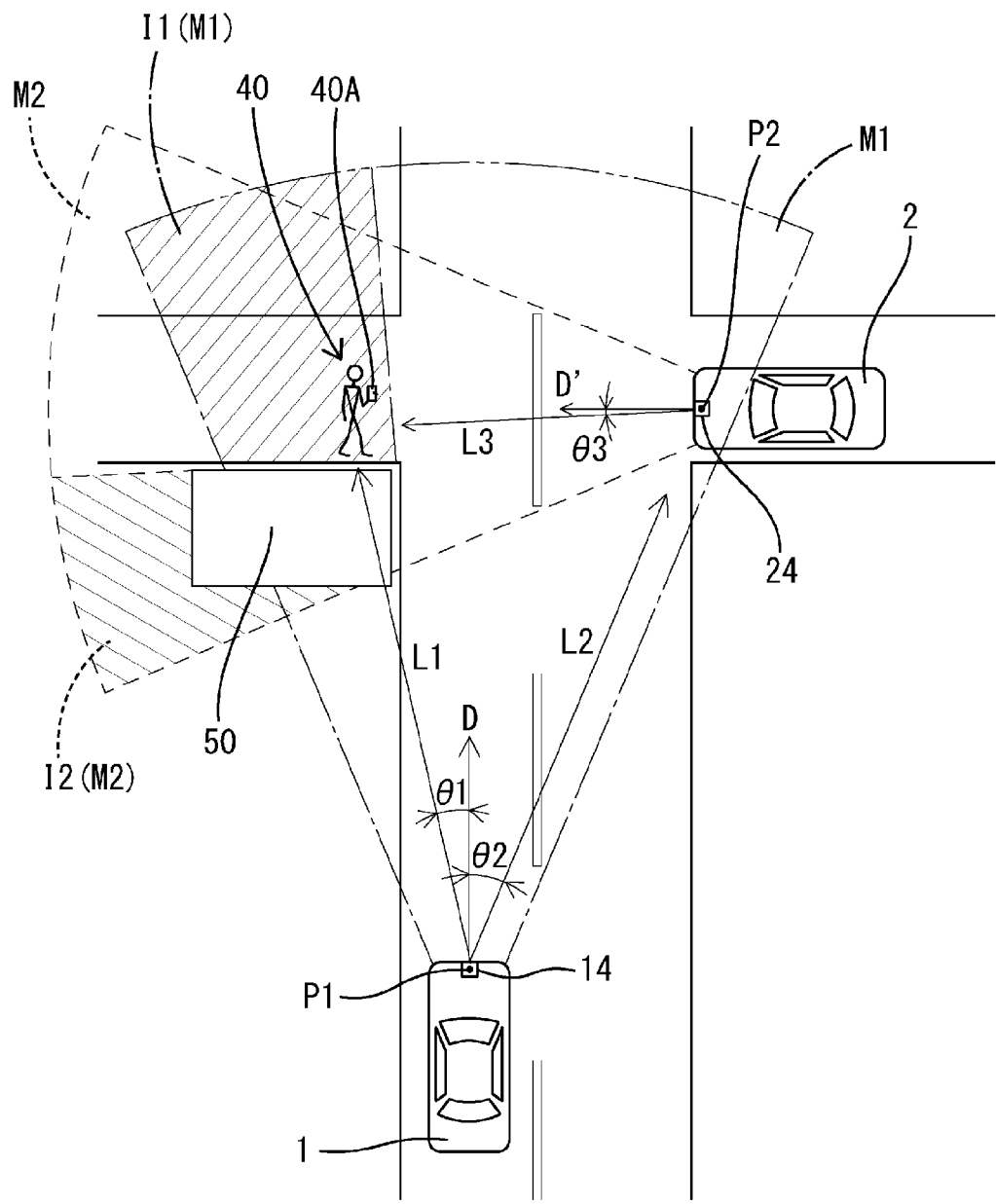
FIG. 3 is an illustrative diagram illustrating another example 1 of a state in which an external object is detected by the object detection system for a vehicle according to the first embodiment.

If it is determined, in step S4, that the object position information has been acquired from the second vehicle 2, the control unit 10 proceeds to step S5 and calculates the direction θ1 and the distance L1 of the external object based on the acquired object position information. For example, object position information that is transmitted from the second vehicle 2 in a situation as illustrated in FIG. 3 includes at least the orientation of a reference direction D' of the second vehicle 2 (orientation identified based on GPS information), a distance L3 from the second vehicle 2 to the external object, and a direction θ3 of the external object with respect to the reference direction D' of the second vehicle 2 (travel direction in the example of FIG. 3). Note that, in the illustrative diagram of FIG. 3, the reference sign M1 indicates a detection range of the position detection sensor 14, and the reference sign I1 indicates a non-detection range (range that is a blind spot due to an object). Also, the reference sign M2 indicates a detection range of the object position detection unit 24 (position detection sensor), and the reference sign I2 indicates a non-detection range (range that is a blind spot due to the object).

Further, in this configuration, the first vehicle 1 includes the position detection sensor 14 corresponding to the vehicle position recognition unit, and the position detection sensor 14 is capable of detecting the position of the second vehicle 2. Specifically, a distance L2 from a reference position P1 of the first vehicle 1 to the second vehicle 2 and a direction θ2 of the second vehicle 2 with respect to the predetermined reference direction D are calculated. By determining the distance L2 and the direction θ2, a position P2 of the second vehicle 2 (relative position of the second vehicle 2 with respect to the position P1 and the reference direction D) is also determined. Note that, when positions of a plurality of objects are detected by the position detection sensor 14, GPS position information (position information regarding the second vehicle 2 that is identified with GPS information acquired by the second vehicle 2 from the GPS satellite 30) may be acquired from the second vehicle 2, and the position of an object that is within a predetermined distance from a position that is identified with the GPS position information may be determined as the position P2 of the second vehicle 2. Then, the control unit 10 corresponding to the position identification unit identifies the position of the external object 40 based on the position P2 of the second vehicle 2 detected by the position detection sensor 14 and the object position information acquired by the inter-vehicle communication unit 11 (information acquisition unit). Specifically, as a result of the position P2 of the second vehicle 2 being identified and the orientation of the reference direction D' relative to the reference direction D being identified, it is possible to identify in which direction and how far the external object 40 is located from the position P2. Therefore, it is possible to calculate the distance L1 from the first vehicle 1 to the external object 40 and the direction θ1 of the external object 40 with respect to the predetermined reference direction D.

Note that, in this case too, it is possible to calculate a distance from the current position of the first vehicle 1 to a position where it is at its closest to the external object 40 based on the calculated distance L1 and direction θ1, and calculate a time T2 necessary for the first vehicle 1 to travel from the current position to the position where it is at its closest to the external object 40 by dividing the obtained distance by the vehicle speed V1.

If it is determined, in step S4, that the object position information was not acquired from the second vehicle 2, the control unit 10 proceeds to step S6 and identifies the position of the external object 40 based on a received result of position information regarding the external object 40. Specifically, the distance L1 between the first vehicle 1 and the information terminal 40A and the direction θ1 of the information terminal 40A relative to the reference direction D of the first vehicle 1 are identified based on position information (position information that identifies latitude and longitude) regarding the first vehicle 1 identified with GPS information that is obtained by the GPS communication unit 13 through communication with the GPS satellite 30 and position information (position information that identifies latitude and longitude) regarding the information terminal 40A identified with GPS information that is obtained by the information terminal 40A through communication with the GPS satellite 30. Note that the orientation of the reference direction D (front-rear direction) of the first vehicle 1 is identified based on GPS information by a known method similar to that employed in a car navigation system.

In this case too, it is possible to calculate a distance from the current position of the first vehicle 1 to a position where it is at its closest to the external object 40 based on the identified position of the external object 40, and calculate a time T3 necessary for the first vehicle 1 to travel from the current position to the position where it is at its closest to the external object 40 by dividing the obtained distance by the vehicle speed V1.

As described above, in this configuration, the control unit 10 corresponding to the position identification unit performs the control illustrated in FIG. 4, and under the condition that the position of the second vehicle 2 is recognized by the position detection sensor 14 (vehicle position recognition unit) and the object position information is acquired by the inter-vehicle communication unit 11 (information acquisition unit) from the second vehicle 2, the control unit 10 identifies the position of the external object 40 based on the result of recognition of the position detection sensor 14 and the object position information. In contrast, when the object position information cannot be acquired (for example, at least either of a case where the position of the second vehicle 2 is not recognized by the position detection sensor 14 and a case where the object position information is not acquired by the inter-vehicle communication unit 11 from the second vehicle 2), the wireless communication unit 12 corresponding to the second information acquisition unit acquires position information regarding the information terminal.

After performing the processing in any of steps S3, S5, and S6, the control unit 10 determines whether or not a warning needs to be made (step S7). Specifically, in a case where the time (T1, T2, or T3) necessary for the first vehicle 1 to travel from the current position to the position where it is at its closest to the position of the external object 40 is shorter than a predetermined time, the routine proceeds to step S8 and a warning operation is performed by the notification unit 15. The warning operation performed by the notification unit 15 may be, for example, either or both of sounding a buzzer or a horn and displaying a message using a lamp or a display device. Note that, in step S8, a plurality of predetermined times may be set and the tone, length, pattern, or the like of the sound of the buzzer may change according to the length of time (T1, T2, or T3) necessary for the first vehicle 1 to travel from the current position to the position where it is at its closest to the position of the passerby. If it is determined, in step S7, that a warning is unnecessary, the control illustrated in FIG. 4 is ended without the warning operation in step S8 being performed.

The following describes examples of effects of the above configuration.

In the object detection device 3 for a vehicle, the control unit 10 (position identification unit) provided in the first vehicle 1 identifies the position of the external object based on the position of the second vehicle 2 recognized by the vehicle position recognition unit and the object position information acquired by the inter-vehicle communication unit 11 (information acquisition unit). As described above, the position of the external object 40 can be identified using the result of detection of the external object by the object position detection unit 24 of the second vehicle 2, and therefore, even when an external object is difficult to detect directly from the position of the first vehicle 1, the possibility that the external object can be detected with high accuracy is increased so long as the external object can be detected by the object position detection unit 24 of the second vehicle 2.

The first vehicle 1 includes the wireless communication unit 12 (second information acquisition unit) that acquires position information regarding the information terminal 40A that the external object has from the position identification system 42 that identifies the position of the information terminal 40A based on GPS information. Under the condition that the position of the second vehicle 2 is recognized by the vehicle position recognition unit and the object position information is acquired by the inter-vehicle communication unit 11 (information acquisition unit) from the second vehicle 2, the control unit 10 (position identification unit) identifies the position of the external object based on the result of recognition of the vehicle position recognition unit and the object position information, and in at least either of a case where the position of the second vehicle 2 is not recognized by the vehicle position recognition unit and a case where the object position information is not acquired by the inter-vehicle communication unit 11 (information acquisition unit) from the second vehicle 2, the control unit 10 can identify the position of the external object under the condition that position information regarding the information terminal 40A is acquired by the wireless communication unit 12 (second information acquisition unit).

According to this configuration, even when the vehicle position recognition unit cannot recognize the position of the second vehicle 2 or when the inter-vehicle communication unit 11 (information acquisition unit) cannot acquire the object position information from the second vehicle 2, there is a possibility that the position of the external object can be identified. For example, in a case where the external object is in possession of the information terminal 40A, it is likely that the position of the external object will be identified based on the position information regarding the information terminal 40A acquired by the wireless communication unit 12 (second information acquisition unit).

The vehicle position recognition unit includes the position detection sensor 14 that detects the position of the second vehicle 2. The position identification unit identifies the position of the external object based on the position of the second vehicle 2 detected by the position detection sensor 14 and the object position information acquired by the inter-vehicle communication unit 11 (information acquisition unit).

According to this configuration, the positional relationship between the first vehicle 1 and the second vehicle 2 can be obtained with high accuracy based on the result of detection by the position detection sensor 14, and the positional relationship between the second vehicle 2 and the external object can also be obtained with high accuracy based on the result of detection by the object position detection unit 24, and therefore the relative position of the external object with respect to the first vehicle 1 can be identified more accurately.

Other Embodiments

The present disclosure is not limited to the embodiment described above with reference to the drawings, and the technical scope of the present disclosure also encompasses embodiments as described below, for example.

Although a passerby is described as an example of the external object in the above embodiment, an external object other than a passerby may be the detection target. For example, a vehicle such as a bicycle or an animal other than a person may be detected.

Although the inter-vehicle communication unit 11 that serves as the information acquisition unit and the wireless communication unit 12 that serves as the second information acquisition unit are configured as separate devices in the above embodiment, these units may be constituted by a single device. That is, these units may be constituted by a single device that has the function of the information acquisition unit and the function of the second information acquisition unit.

Although, in the above embodiment, the information processing device 100 acquires the object position information regarding the external object 40 by wirelessly communicating directly with the information processing device 200 of the second vehicle 2, the information processing device 100 may be configured to wirelessly communicate indirectly with the information processing device 200 via a public communication line such as public Wi-Fi, and indirectly acquire the object position information transmitted from the information processing device 200. Alternatively, the object position information may be indirectly acquired via an information relaying device or the like provided on a road, for example.

Although, in the above embodiment, the information processing device 100 acquires the GPS information regarding the information terminal 40A in the possession of the external device 40 directly from the information terminal 40A, the GPS information may be indirectly acquired via a public communication line such as public Wi-Fi or an information relaying device or the like provided on a road, for example.

Although, in the above embodiment, the position detection sensor 14 corresponds to an example of the vehicle position recognition unit and functions to recognize the position of the second vehicle 2, the control unit 20 may generate position information that indicates the position of the second vehicle 2 on a map (such as information that indicates latitude and longitude) based on GPS information acquired by the GPS communication unit 23 of the second vehicle 2, and the inter-vehicle communication unit 21 may transmit this position information to the inter-vehicle communication unit 11 of the first vehicle 1. In this case, the position of the second vehicle 2 can be identified as a result of the position information being received by the inter-vehicle communication unit 11 and analyzed by the control unit 10, in which case, the inter-vehicle communication unit 11 and the control unit 10 correspond to an example of the vehicle position recognition unit.

Figure 5:
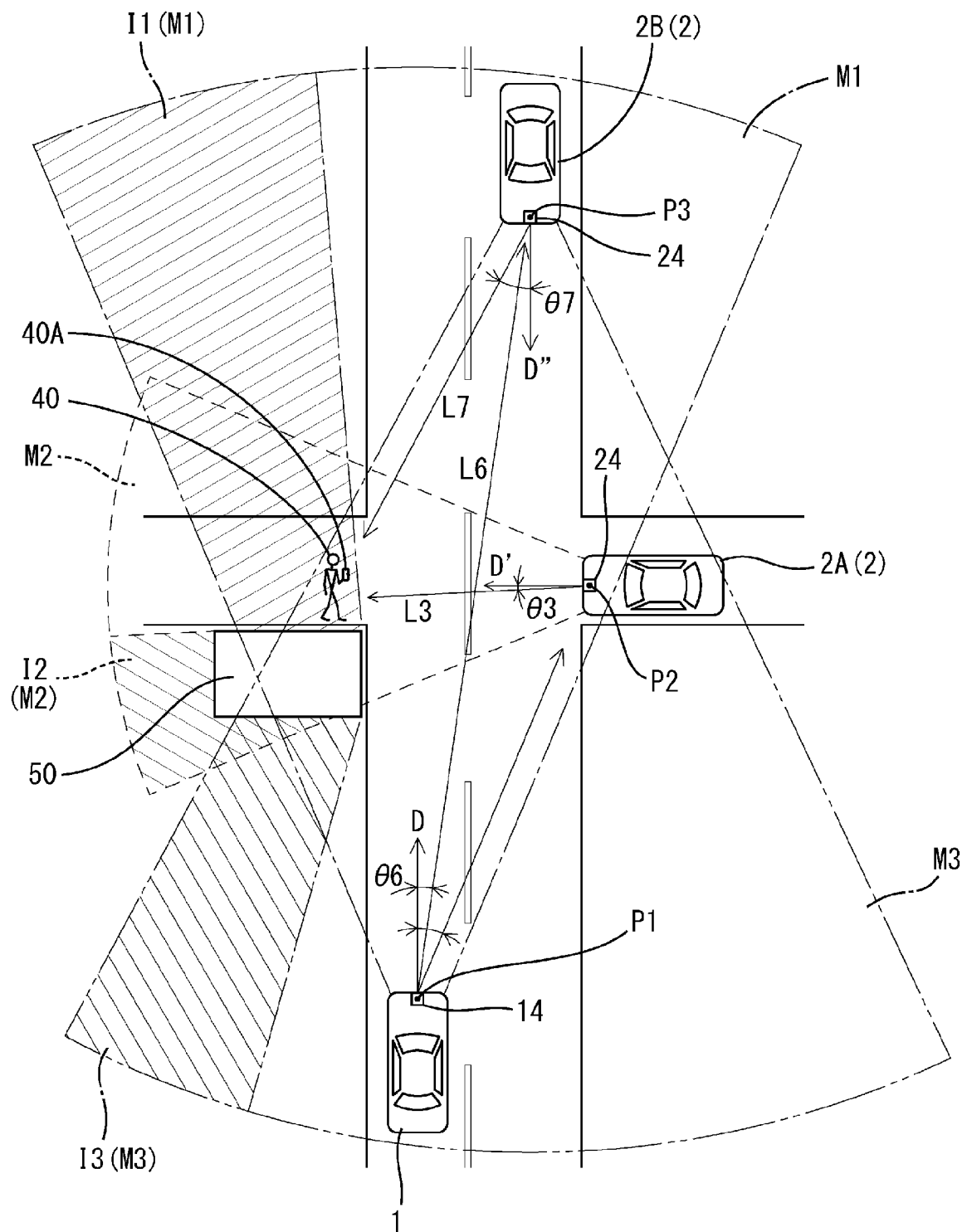
FIG. 5 is an illustrative diagram illustrating another example 2 of a state in which an external object is detected by the object detection system for a vehicle according to the first embodiment.

In a case where there are a plurality of second vehicles (second vehicle 2A and second vehicle 2B) as illustrated in FIG. 5, the object detection device 3 of the first vehicle 1 (i.e., the information processing device 100) may acquire object position information from the plurality of second vehicles 2 and identify the position of the external object based on the acquired object position information. In the example of FIG. 5, the object position detection unit 24 of the second vehicle 2B detects a distance L7 from the second vehicle 2B to the external object 40 and a direction θ7 of the external object 40 relative to a reference direction D" of the second vehicle 2B. On the other hand, the object position detection unit 24 of the second vehicle 2A detects a distance L3 from the second vehicle 2A to the external object 40 and a direction θ3 of the external object 40 relative to a reference direction D' of the second vehicle 2A. In this case, the object detection device 3 performs inter-vehicle communication with each of the second vehicles 2A and 2B to acquire object position information (the distance L3 and direction θ3 of the external object 40 relative to the second vehicle 2A and information regarding the reference direction D' of the second vehicle 2A) from the second vehicle 2A and acquire object position information (the distance L7 and direction θ7 of the external object 40 relative to the second vehicle 2B and information regarding the reference direction D" of the second vehicle 2B) from the second vehicle 2B. In this case, the control unit 10 may identify the position of the external object 40 based on object position information acquired from either of the vehicles (for example, a vehicle that is closest to the first vehicle or a vehicle that is closest to the external object) by a predetermined selection method, or identify the distance L1 to the external object 40 and the direction θ1 by averaging distances to the external object 40 and directions thereof that are identified based on the object position information acquired from the respective vehicles.

The invention claimed is:
1. An object detection device for a vehicle, comprising:
a vehicle position recognition unit that is provided in a first vehicle and recognizes a position of a second vehicle;
an inter-vehicle communication unit that is provided in the first vehicle and acquires, from the second vehicle, object position information regarding an external object that is generated based on a result of detection of the external object by an object position detection unit of the second vehicle; and a position identification unit that identifies a position of the external object based on the position of the second vehicle recognized by the vehicle position recognition unit and the object position information acquired by the inter-vehicle communication unit, wherein the inter-vehicle communication unit acquires the object position information that includes information that enables identification of a distance from the second vehicle to the external object, a second reference direction determined by the second vehicle, and a direction of the external object from the second vehicle with respect to the second reference direction, and the position identification unit identifies a direction of the external object from the first vehicle with respect to a first reference direction determined by the first vehicle, based on the first reference direction, a distance from the first vehicle to the second vehicle, a direction of the second vehicle from the first vehicle with respect to the first reference direction, the distance from the second vehicle to the external object, the second reference direction, and the direction of the external object from the second vehicle with respect to the second reference direction.

2. The object detection device for a vehicle according to claim 1, further comprising:

a second inter-vehicle communication unit that receives position information regarding an information terminal that the external object has from a position identification system that identifies a position of the information terminal based on GPS information, wherein, under a condition that the position of the second vehicle is recognized by the vehicle position recognition unit and the object position information is acquired by the inter-vehicle communication unit from the second vehicle, the position identification unit identifies the position of the external object based on a result of recognition of the vehicle position recognition unit and the object position information, and in at least either of a case where the position of the second vehicle is not recognized by the vehicle position recognition unit and a case where the object position information is not acquired by the inter-vehicle communication unit from the second vehicle, the position identification unit identifies the position of the external object under a condition that position information regarding the information terminal is acquired by the second inter-vehicle communication unit.

3. The object detection device for a vehicle according to claim 1, wherein the vehicle position recognition unit includes a position detection sensor that detects the position of the second vehicle, and the position identification unit identifies the position of the external object based on the position of the second vehicle detected by the position detection sensor and the object position information acquired by the inter-vehicle communication unit.

4. An object detection system for a vehicle, comprising:

an information processing device for a first vehicle that is provided in a first vehicle; and an information processing device for a second vehicle that is provided in a second vehicle, wherein the information processing device for the second vehicle includes:

an object position detection unit that detects a position of an external object; and an information transmission unit that transmits, to the first vehicle, object position information regarding the external object that is generated based on a result of detection of the external object by the object position detection unit, the information processing device for the first vehicle includes:

a vehicle position recognition unit that recognizes a position of the second vehicle;

an inter-vehicle communication unit that acquires the object position information transmitted from the information transmission unit; and a position identification unit that identifies a position of the external object based on the position of the second vehicle recognized by the vehicle position recognition unit and the object position information acquired by the inter-vehicle communication unit, the inter-vehicle communication unit acquires the object position information that includes information that enables identification of a distance from the second vehicle to the external object, a second reference direction determined by the second vehicle, and a direction of the external object from the second vehicle with respect to the second reference direction, and the position identification unit identifies a direction of the external object from the first vehicle with respect to a first reference direction determined by the first vehicle, based on the first reference direction, a distance from the first vehicle to the second vehicle, a direction of the second vehicle from the first vehicle with respect to the first reference direction, the distance from the second vehicle to the external object, the second reference direction, and the direction of the external object from the second vehicle with respect to the second reference direction.

5. The object detection system for a vehicle according to claim 4, wherein the information processing device for the first vehicle includes a second inter-vehicle communication unit that acquires position information regarding an information terminal that the external object has from a position identification system that identifies a position of the information terminal based on GPS information, and under a condition that the position of the second vehicle is recognized by the vehicle position recognition unit and the object position information is acquired by the inter-vehicle communication unit from the second vehicle, the position identification unit identifies the position of the external object based on a result of recognition of the vehicle position recognition unit and the object position information, and in at least either of a case where the position of the second vehicle is not recognized by the vehicle position recognition unit and a case where the object position information is not acquired by the inter-vehicle communication unit from the second vehicle, the position identification unit identifies the position of the external object under a condition that position information regarding the information terminal is acquired by the second inter-vehicle communication unit.

6. The object detection system for a vehicle according to claim 4, wherein the vehicle position recognition unit includes a position detection sensor that detects the position of the second vehicle, and the position identification unit identifies the position of the external object based on the position of the second vehicle detected by the position detection sensor and the object position information acquired by the inter-vehicle communication unit.

7. The object detection device for a vehicle according to claim 2, wherein the vehicle position recognition unit includes a position detection sensor that detects the position of the second vehicle, and the position identification unit identifies the position of the external object based on the position of the second vehicle detected by the position detection sensor and the object position information acquired by the inter-vehicle communication unit.

8. The object detection system for a vehicle according to claim 5, wherein the vehicle position recognition unit includes a position detection sensor that detects the position of the second vehicle, and the position identification unit identifies the position of the external object based on the position of the second vehicle detected by the position detection sensor and the object position information acquired by the inter-vehicle communication unit.

* * * * *